United States Patent
Lorenz

(10) Patent No.: US 6,874,270 B2
(45) Date of Patent: Apr. 5, 2005

(54) ANIMAL DECOY AND METHOD FOR MAKING SAME

(76) Inventor: Steven J. Lorenz, 31004 Grand Dr., Waterford, WI (US) 53185

( * ) Notice: Subject to any disclaimer, the term of this patent is extended or adjusted under 35 U.S.C. 154(b) by 0 days.

(21) Appl. No.: 10/349,409

(22) Filed: Jan. 22, 2003

(65) Prior Publication Data

US 2004/0139646 A1 Jul. 22, 2004

(51) Int. Cl.⁷ ............................................. A01M 31/06
(52) U.S. Cl. .................................................... 43/3; 43/2
(58) Field of Search ........................... 43/2, 3; 446/365, 446/388

(56) References Cited

U.S. PATENT DOCUMENTS

| | | | | |
|---|---|---|---|---|
| 1,062,713 A | * | 5/1913 | Johnson | 43/3 |
| 1,782,042 A | * | 11/1930 | Kunkel | 446/365 |
| 2,237,897 A | | 4/1941 | Vos | |
| 2,395,247 A | * | 2/1946 | Buffenbarger | 446/388 |
| 2,450,572 A | * | 10/1948 | Ballard | 43/3 |
| 2,466,626 A | * | 4/1949 | Valasek | 43/3 |
| 2,478,585 A | * | 8/1949 | Kouba | 43/3 |
| 2,489,271 A | * | 11/1949 | Colgan | 43/3 |
| 2,885,813 A | * | 5/1959 | Kratzert | 43/3 |
| 3,245,168 A | * | 4/1966 | Pool | 43/3 |
| 3,350,808 A | * | 11/1967 | Mitchell | 43/3 |
| 3,950,879 A | * | 4/1976 | Kwako | 43/3 |
| 4,251,937 A | | 2/1981 | Curley | |
| 4,318,240 A | * | 3/1982 | Hillesland | 43/3 |
| 4,753,028 A | * | 6/1988 | Farmer | 43/3 |
| 4,845,872 A | * | 7/1989 | Anderson | 43/3 |
| 4,928,418 A | * | 5/1990 | Stelly | 43/3 |
| 4,972,620 A | * | 11/1990 | Boler | 43/3 |
| 5,293,709 A | * | 3/1994 | Cripe | 43/3 |
| 5,335,438 A | * | 8/1994 | Terrill | 43/1 |
| 5,572,823 A | | 11/1996 | Savaria | |
| 5,943,807 A | | 8/1999 | McPherson | |
| 6,082,036 A | * | 7/2000 | Cripe | 43/3 |
| 6,115,953 A | * | 9/2000 | Wise | 43/2 |
| 6,374,530 B1 | * | 4/2002 | Mierau | 43/3 |
| 6,470,620 B1 | * | 10/2002 | Acker | 43/3 |
| 2002/0073598 A1 | * | 6/2002 | Wright | 43/3 |
| 2002/0095848 A1 | * | 7/2002 | Northouse | 43/3 |

FOREIGN PATENT DOCUMENTS

WO        WO 02/19818        *   3/2002

* cited by examiner

Primary Examiner—Peter M. Poon
Assistant Examiner—David J Parsley
(74) Attorney, Agent, or Firm—Joseph S. Heino; Patrick M. Bergin

(57) ABSTRACT

A game bird decoy assembly and a method for making same includes a lightweight planar member contoured in the form of the silhouette of a game bird. The planar member has two opposing faces. A visually and graphically accurate rendition of a game bird is applied to each face of the planar member. The planar member is foldable so as to reduce the bulk of the decoy assembly. When the planar member is in its upright position, the fold extends across the planar member at an angle relative to the vertical. When unfolded, the decoy assembly is held open by use of a support rod that is insertable within the planar member near the point of the fold. The support rod extends through the planar member, across the fold, and into the adjacent portion of the planar member. It also includes a pair of apertures for suspending one or more of the assemblies from a hunter's belt.

11 Claims, 5 Drawing Sheets

ANIMAL DECOY AND METHOD FOR MAKING SAME

FIELD OF THE INVENTION

The present invention relates generally to the field of hunting and to animal decoys of the type that are commonly used for hunting large game birds, such as turkeys, geese, ducks and the like. More particularly, it relates to an animal decoy, and to a method for making the decoy, whereby the decoy simulates another animal visually so as to aid in the attraction of other live animals to the area of the decoy. It also relates to a decoy that is easily transportable and readily usable in the field by the hunter.

BACKGROUND OF THE INVENTION

It has long been recognized by hunters that the use of animal decoys can aid in the attraction of like animals to the same area or vicinity as the decoy so that the hunter can be placed in relatively close proximity to his or her prey. This proximity greatly increases the odds of the hunt being a success. Indeed, ancient hunters used straw duck and goose decoys to entice migratory flocks from the skies to areas of apparent safe haven only to fall prey to a hunter's swift arrow. Modern day hunters continue the practice of utilizing decoys of game birds in their attempt to outsmart their prey. Some decoys are three dimensional, others are configured in the form of a wind sock. Each attempts to utilize a somewhat visually accurate depiction of a game bird that is realistic, but generally stationary. In the experience of this avid hunter and inventor, however, most three-dimensional decoys that are presently commercially available tend to be bulky, are difficult to transport and set up, and are relatively expensive. As evidenced by U.S. Pat. No. 6,634,132 entitled Animal Decoy and Method for Making Same, this inventor has experience in designing two-dimensional decoys of the type used for hunting large game animals. Hunting game birds requires a slightly different strategy and the clips disclosed and claimed in the aforementioned application can not, in the experience of this inventor, be used for the intended purpose. That is, the plastic clips have a tendency to reflect light in such a way that the clips scare away the already wary game bird. What is needed is another quick, easy and uncomplicated way of stabilizing the two-dimensional decoy once the decoy has been unfolded, and to accomplish this without using any external stabilizing means or mechanisms.

SUMMARY OF THE INVENTION

It is, therefore, a principal object of this invention to provide a new, useful and uncomplicated game bird decoy assembly and a method for making such an assembly that requires only a minimal number of elements and that requires only a minimal number of steps to utilize. It is a further object of this invention to provide such an assembly that is realistic to other game birds in a visual sense. It is yet another object of this invention to provide such an assembly that is lightweight and easily transported by the user and also easy to assemble and set up in the field. It is still another object of this invention to provide such an assembly that stabilizes at least two foldable members relative to one another without any external stabilizing means or mechanisms.

The present invention has obtained these objects. It provides, in the preferred embodiment, for a game bird decoy assembly and a method for making the same that includes a lightweight planar member contoured in the form of the silhouette of a game bird. The planar member has two opposing faces. A visually and graphically accurate rendition of a game bird, by artist's brush, photograph or otherwise, is applied to each face of the planar member. The planar member is foldable along a crease so as to reduce the bulk of the decoy assembly. It also includes an aperture for suspending one or more of the assemblies from a hunter's hip, belt, backpack or the like. When unfolded, the decoy assembly is held open by use of an internal rod that passes through the planar member at the point of the crease or fold, the rod also serving as a stand for the planar member. The foregoing and other features of the device and method of the present invention will be further apparent from the description that follows.

DETAILED DESCRIPTION

Figure 1:
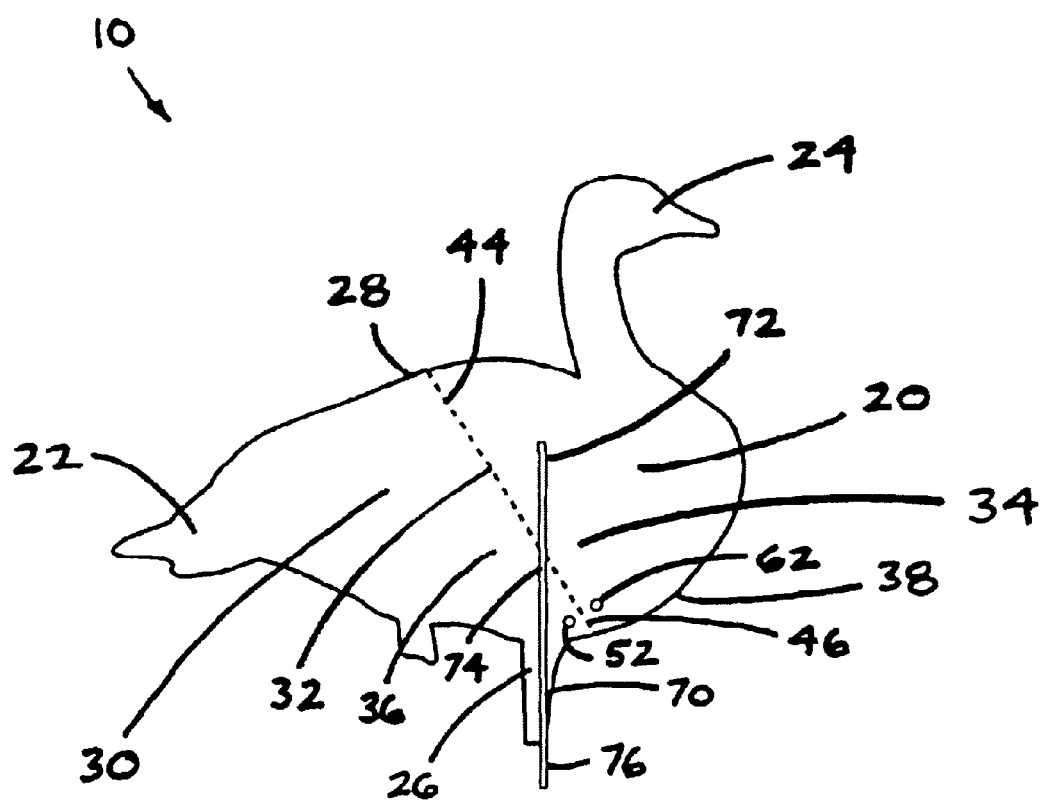
FIG. 1 is a front elevational view of an animal decoy assembly constructed in accordance with the present invention and showing an upright goose version of the decoy shown in the open, or unfolded, position.

Referring now to the drawings in detail, wherein like numbers represent like elements throughout, FIG. 1 illustrates a preferred embodiment of an animal decoy assembly, generally identified 10, that has been constructed in accordance with the device and method of the present invention. The assembly 10 includes a lightweight and substantially planar decoy frame or body 20. Although the planar decoy body 20 as shown in FIG. 1 assumes the shape or outline generally representative of a goose standing in an upright position, it is to be understood that a the shape could also be that of an upright male turkey, a feeding turkey, a hen, or even either sex of a different species of game bird such as a duck, or the like, without deviating from the scope of the present invention. See, for example, FIGS. 3 and 4.

In the preferred embodiment, the planar decoy body 20 is constructed of corrugated plastic board, although closed-cell foam, fluted plastic or other semi-rigid like material could be used which would still come within the scope of the present invention. Affixed to either side of the decoy body 20 of the preferred embodiment is the pre-printed rendering of the animal (not shown), with one side being a mirror image of the other. For purposes of maximizing the visual effect of the printed board substrate that is used as the base for the two-dimensional image of an animal (not shown) and is attached to each side of the substrate, a white substrate is preferred. The decoy body 20 includes a front body, or head, portion 24 and a rear body, or tail, portion 22. Disposed between and below the head portion 24 and the tail portion 22 of the decoy body 20 is a leg portion 26. Situated between the head portion 24 and the tail portion 22 of the decoy body 20 is a main torso portion 30. In the preferred embodiment, a body fold or crease 32 divides the main torso portion 30 into a front torso portion 34 and a rear torso portion 36. This crease 32 allows the front torso portion 34 of the decoy body 20 to fold over onto the rear torso portion 36, or vice versa. See FIG. 2.

As shown in FIG. 1, the crease 32 has an uppermost portion 44 that lies along and effectively intersects the uppermost edge 28 of the main torso portion 30 of the decoy body 20. The crease 32 also has a lowermost portion 46 that lies along and effectively intersects the lowermost edge 38 of the torso portion 30 of the decoy body 20. In the preferred embodiment, the crease 32 lies at an angle that is acute both relative to the vertical and relative to the direction of the corrugated channels 80 that are part of the planar board. In this fashion, the crease 32 effectively cuts across them. The purpose of this configuration will become apparent later in this detailed description.

The preferred embodiment of the present invention also includes a number of apertures that are defined within the planar decoy body 20, each serving a different purpose. For example, a pair of apertures 52, 62 are defined within the planar decoy body 20 such that one aperture 62 lies within the front body 24 and one aperture 52 lies within the main torso portion 30 of the decoy body 20 in the area of the leg portion 26. See FIG. 1. This pair of apertures 52, 62 form a single bore 64 upon folding of the body 20 along the crease 32. See FIGS. 2 and 4. It should be understood that placement of the bore 64 is variable and may occur at almost any point along the crease 32. A clip or a wire 12 may be inserted through the bore 64 for suspending the assembly 10 from the hunter's hip, belt, back-pack, or the like as the assembly 10 is transported to and from the hunting site. Furthermore, one or more such assemblies 10 may be held in this fashion.

Another aperture 66 may be defined within the rear body portion 22 of the planar decoy body 20. See, for example, FIG. 3. This aperture 66 is formed so as to allow the hunter to attach a string or filament (not shown) to the decoy body 20 for the purpose of simulating movement of the game bird decoy as such is desired or required. This subtle movement enhances the realistic appearance of the decoy. This action is possible because the decoy body 20 is intended to be free-standing. This is, a longitudinally extending metal support rod 70 is insertable within the leg portion 26 of the decoy body 20. See FIGS. 1 and 3. The metal support rod 70 includes an uppermost portion 72, a medial portion 74 and a lowermost portion 76. Once the support rod 70 is fully inserted, the uppermost portion 72 of the support rod 70 lies within that portion 34 of the torso 30 that is to one side of the crease 32, the medial portion 74 of the support rod 70 lies within that portion 36 of the torso 30 that is to the other side of the crease 32, and the lowermost portion 76 of the support rod 70 is functionally adapted to be inserted into the ground. In this fashion, the support rod 70 extends through one corrugated aperture (not shown) of the body 20 and forms a continuum therewith.

In the method of the present invention, a planar sheet of lightweight substrate, such as corrugated plastic board, fluted plastic or the like, is used as the base for the two-dimensional image of an animal (not shown) that is attached to each side of the substrate. It should also be noted here that, for purposes of maximizing the print image of the animal on the substrate, a white substrate is preferred. Using this image as a guide, the shape or outline generally representative of a female turkey, or hen, standing in an upright position is stamped out of the substrate. See FIGS. 3 and 4. This forms the planar decoy frame or body 20. At the same time, the carrying apertures 52, 62, and the movement aperture 66 are all stamped or die cut into the decoy body 20. As previously described, the shape could also be that of a male turkey, a feeding hen, or even either sex of a different species of game bird, or the like, without deviating from the scope of the present invention. Additionally, the planar decoy body 20 could be constructed of corrugated cardboard, closed-cell foam or other semi-rigid like material and still come within the scope of the method of the present invention. One advantage of the corrugated plastic construction is that water resistance and durability as well as ease of receivability of the support rod 70 are built into that construction. That is, the corrugated channels 80 of the material, which channels are oriented generally vertically in the preferred embodiment, provide a linear aperture 82 through which the support rod 70 may pass. Once inserted into that linear aperture 82 of the corrugate, the frictional force of the sidewalls of the aperture that is exerted on the rod 70 maintain the support rod 70 in position until removal of the rod 70 is desired or required.

Figure 2:
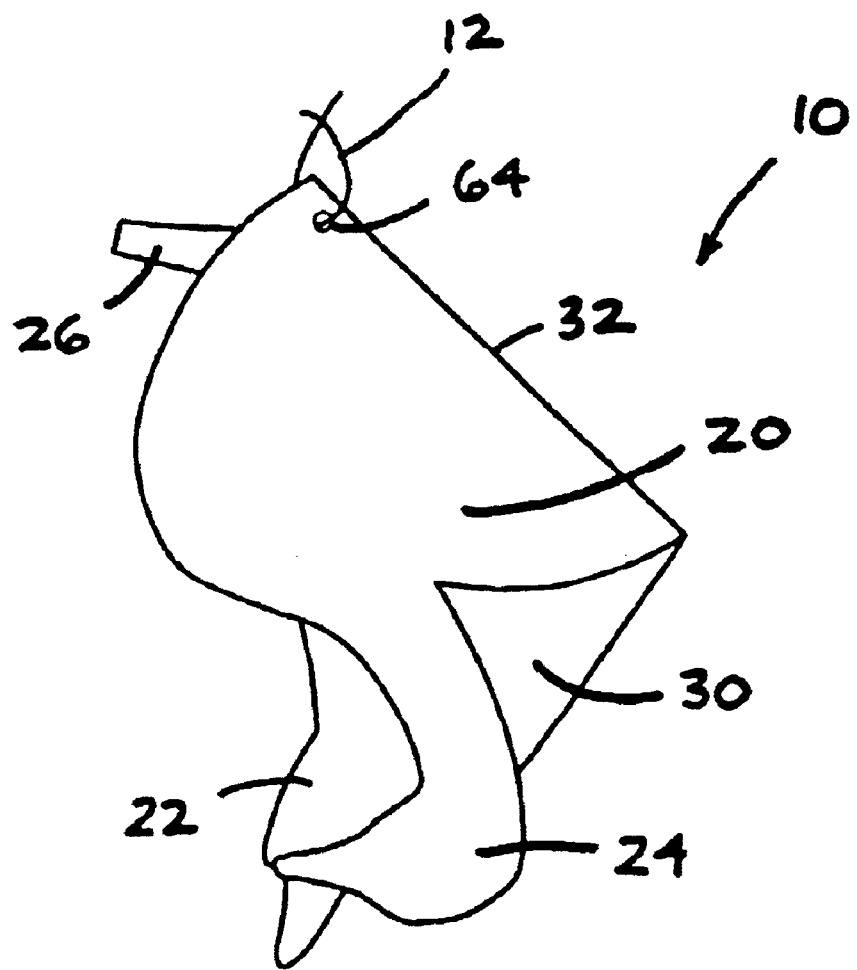
FIG. 2 is another front elevational view of the decoy assembly illustrated in FIG. 1 and showing the decoy in the folded, or closed, position for ease of transportation.
Figure 3:
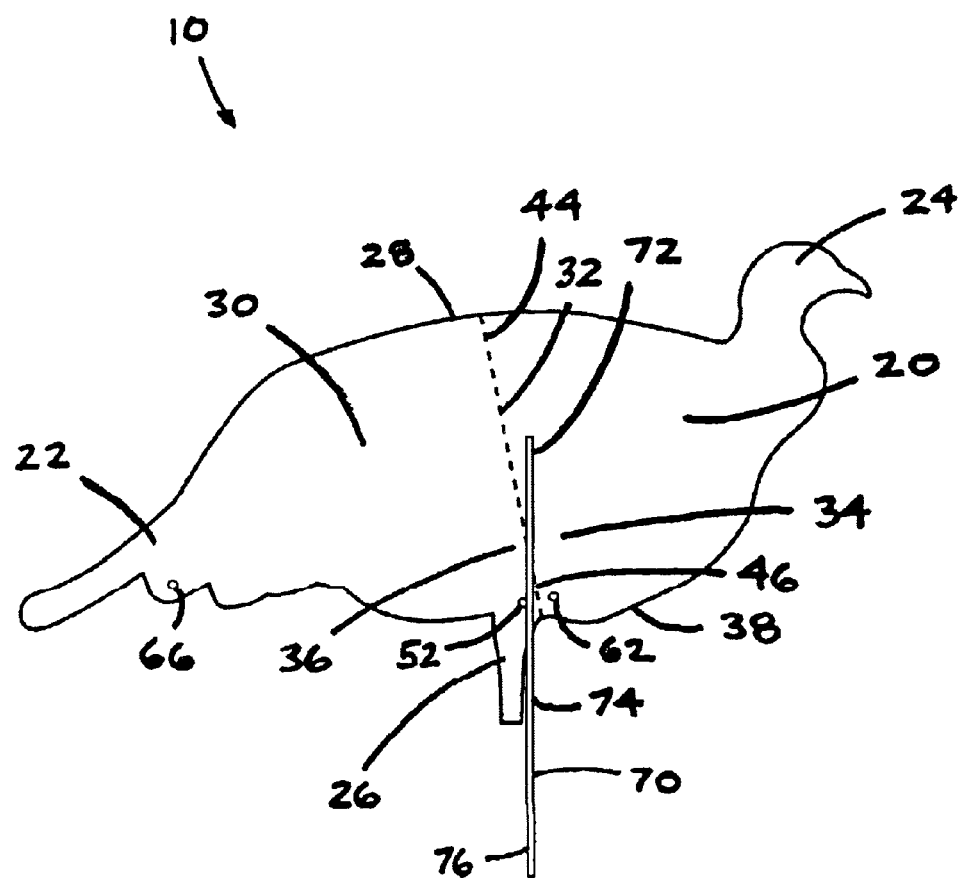
FIG. 3 is a front elevational view of another decoy assembly and showing an upright female turkey, or hen, version of the decoy in the open, or unfolded, position.
Figure 4:
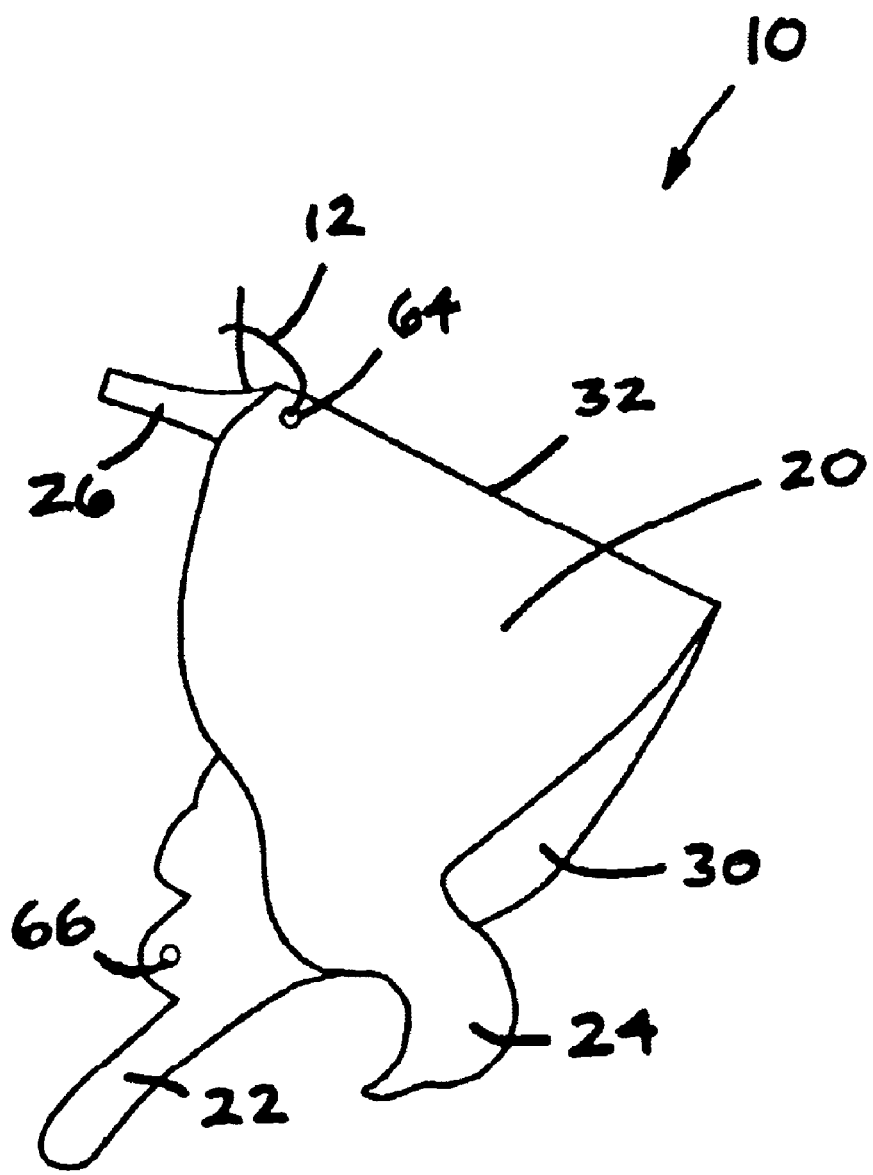
FIG. 4 is a front elevational view of the decoy shown in FIG. 3 when folded.
Figure 5:
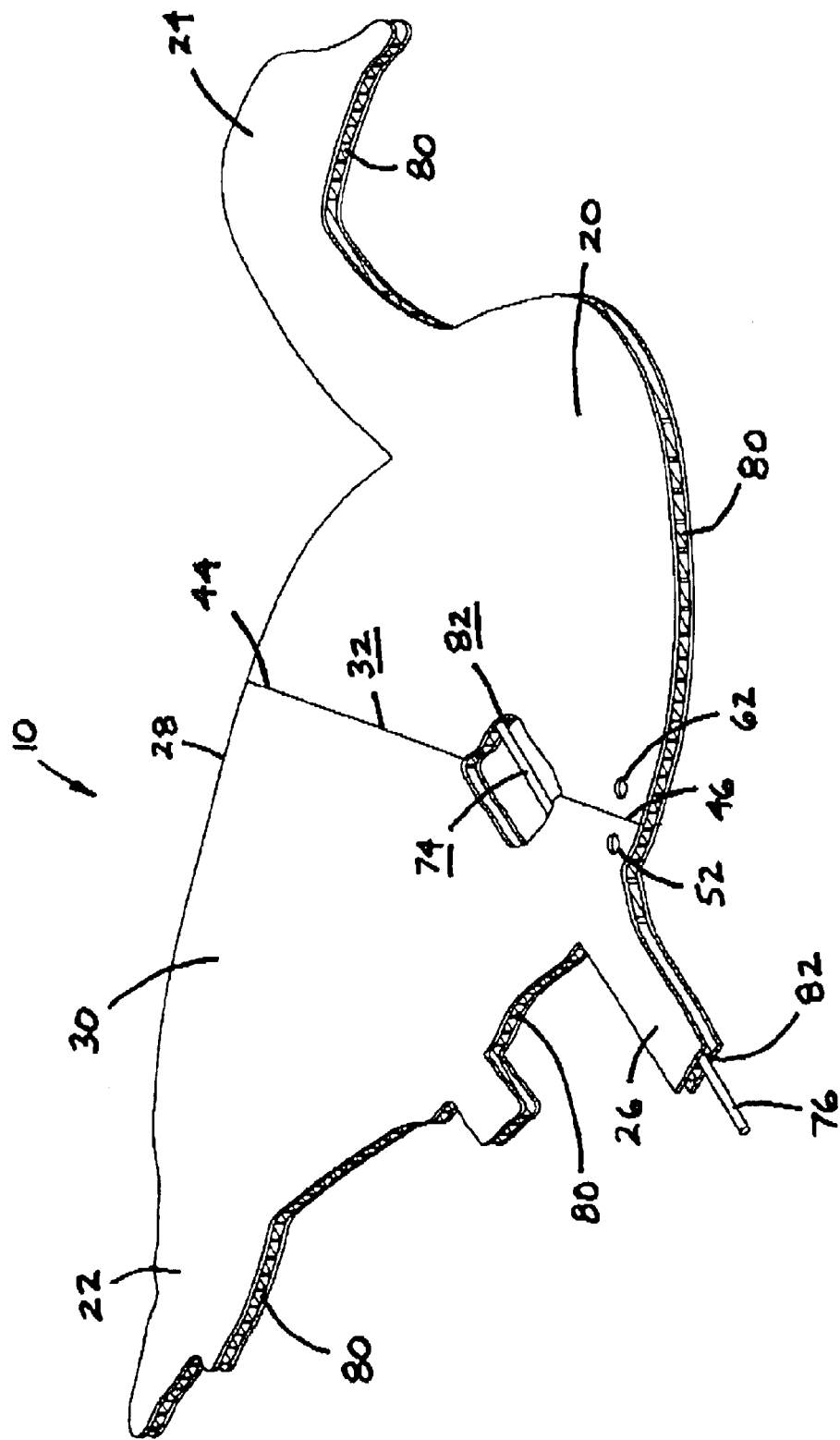
FIG. 5 is a front and bottom perspective view showing the corrugated channels through the decoy as well as cutaway view of a particular linear aperture through which the support rod passes.

In application, the hunter takes one or more of the assemblies 10 with him or her, each assembly 10 being suspended from the hunter's belt or backpack, for example, by use of a clip or wire 12 as shown in FIGS. 2 and 4. Once the hunter reaches the hunting site, the assembly 10 is detached from the wire 12 and the front body portion 24 is folded outwardly away from the torso 30 as shown in FIGS. 1 and 3. The metal support rod 70 is then inserted into the decoy body 20, beginning with one of several of the corrugate channels defined within the leg portion 26 of the body member 20 of the preferred embodiment. The uppermost portion 72 of the rod 70 is continued to be urged into the corrugate channel and across the crease 32. The rod 70 continues into the forward portion 34 of the torso 30 to the point that the medial portion of the rod 74 lies within the leg portion 26 and enough of the lowermost portion 76 of the rod 70 extends downwardly to anchor the assembly 10 in the ground. This can be repeated for any number of assemblies 10 so as to simulate a grounded flock or covey of game birds. The hunter is now ready to move away from the assembly 10 and into a nearby location, waiting for inquisitive prey to check out the decoy. If such is desired, the hunter may use a line or filament (not shown) secured within the movement aperture 66 to occasionally move one or more of the assemblies 10 so as to simulate the movements of a real bird.

From the foregoing detailed description of the illustrative embodiment of the invention set forth herein, it will be apparent that there has been provided a new and useful decoy assembly and a method for making same that requires only a minimal number of elements and only a minimal number of steps to utilize; that is realistic to other animals in a visual sense; that is lightweight and easily transported by the user and also easy to assemble and set up in the field; and that can be free standing as such is desired or required by the hunter.

The principles of this invention having been fully explained in connection with the foregoing, I hereby claim as my invention:

1. A decoy for attracting animals, the decoy comprising:
    a two-dimensional planar member having a shape generally representative of an animal and being foldable along a crease, said crease foldably dividing the planar member into a first planar portion and a second planar portion, said planar member being of a corrugate board having a plurality of channels therethrough, said channels being oriented generally vertically, said crease being at an angle to the corrugated channels;

a visual representation of the animal disposed on each side, of the two-dimensional planar member;

at least one support rod, said support being insertable through at least one linear channel of said plurality of channels such that the support rod is inserted into both the first planar section and the second planar section to maintain the first and second planar portions in coplanar relation and to support the planar member in a generally upright position;

wherein the first portion of the planar member lies to one side of the crease and the second portion of the planar member lies to the other side of the crease and the first and second planar portions are coplanar.

2. The decoy of claim 1 wherein the two-dimensional planar member further comprises a pair of mutually aligned apertures that form a single bore upon folding of the planar member.

3. The decoy of claim 2 wherein the single bore is configured to receive a connector for securing the planar member to a person during transportation of the decoy.

4. The decoy of claim 1 further comprising at least one leg portion extending from an undersurface of the planar member, said leg portion being configured to receive a portion of the support rod so as to support the planar member in a free-standing arrangement.

5. The decoy of claim 1 wherein the planar member is comprised of a plastic corrugate and the support rod insertion means comprises at least one collinear channel that extends generally vertically through the plastic corrugate.

6. The decoy of claim 5 wherein the corrugate is fabricated from a white or light colored material.

7. The decoy of claim 1 wherein the animal is a game bird such as a turkey, a goose, or duck.

8. A visually representative decoy assembly for attracting game animals, said decoy assembly being both foldable and unfoldable, the assembly comprising:

a corrugated material having a plurality of generally vertically oriented corrugated channels providing at least one linear aperture, said material being in a two-dimensional shape that is visually representative of an animal to form a decoy body, said decoy body having a crease, said crease dividing the decoy body into a front part and a rear part, said crease being at an angle to the at least one linear channel of said plurality of corrugated channels, the visual representation of said decoy body being consistent with the actual appearance of a game animal;

at least one aperture defined within the two-dimensional visual representation; and at least one support rod insertable within the at least one of the corrugated channels of the foldable two-dimensional visual representation such that the support rod is inserted into both the first planar section and the second planar section to maintain the foldable two-dimensional visual representation in an unfolded position and in a free-standing planar arrangement when the two-dimensional visual representation is in the unfolded position.

9. The assembly of claim 8 wherein the two-dimensional visual reputation further includes a pair of mutually aligned apertures that form a single bore upon folding of the visual representation.

10. The assembly of claim 9 wherein the single bore is configured to receive a connector for securing the visual representation to a person during transportation of the assembly.

11. The assembly of claim 8, wherein the game animal is a turkey, a goose, or a duck.

\* \* \* \* \*

UNITED STATES PATENT AND TRADEMARK OFFICE
CERTIFICATE OF CORRECTION

PATENT NO. : 6,874,270 B2
DATED : April 5, 2005
INVENTOR(S) : Steven J. Lorenz

It is certified that error appears in the above-identified patent and that said Letters Patent is hereby corrected as shown below:

Column 6,
Line 26, replace the word "reputation" with -- representation --.

Signed and Sealed this

Eighth Day of November, 2005

JON W. DUDAS
*Director of the United States Patent and Trademark Office*